Feb. 25, 1958 — W. E. LAMPHEAR — 2,824,755
VALVED COUPLING
Filed June 20, 1955 — 2 Sheets-Sheet 1

INVENTOR
Walter Earl Lamphear;
BY
ATTORNEY

Feb. 25, 1958

W. E. LAMPHEAR 2,824,755

VALVED COUPLING

Filed June 20, 1955

INVENTOR
Walter Earl Lamphear
By R. S. Berry
ATTORNEY

# United States Patent Office 2,824,755
Patented Feb. 25, 1958

2,824,755
VALVED COUPLING

Walter Earl Lamphear, Los Angeles, Calif., assignor to Roylin Incorporated, a corporation of California Application June 20, 1955, Serial No. 516,440

9 Claims. (Cl. 284—18)

This invention relates to a hose coupling of the type embodying a cut-off valve operable to substantially close the coupling against the passage of fluid therethrough when the coupling is disconnected and to automatically open the valve on connecting the coupling to a companion member.

The primary object of the invention is to provide a coupling of the above recited character which is applicable to the discharge end of a hose employed in delivering highly heated air to a jet engine to effect movement of rotating parts of the engine preliminary to the delivery of fuel thereto in initiating its automotive operation, whereby on disconnecting the coupling from the intake nipple on an engine a then open valve in the coupling will automatically close so as to prevent the discharge of hot air therethrough.

A purpose of the invention is to provide a construction in a coupling whereby a butterfly valve may be utilized in effecting opening and closing of the coupling by the embodiment of a construction and arrangement whereby the valve will be normally closed when the coupling is disconnected from its associated nipple and will be automatically opened on application of the coupling to the nipple, a feature of the invention being the provision of positive means for locking the valve in its open position adapted to release the valve to its closed position on partial separation of the coupling and nipple.

As will be apparent from the drawing and description when the valve is in what is herein termed a "closed" position, it does not effect a complete closure of the passage through the coupling but in fact permits a small, negligible flow about the periphery of the valve, particularly in the region adjacent the valve-supporting trunnions.

Another object of the invention is to produce a butterfly valve equipped coupling in which the valve, its mounting and its operating mechanism are completely housed within the coupling wherein the actuation of the valve to its locked open position is effected through the medium of a longitudinally slidable sleeve in the coupling controlled by the nipple to which the coupling is attached, and wherein the sleeve and valve are so constructed and arranged that advance of the sleeve will effect direct opening of the valve by a cam action and then serve to positively hold the valve in its fully open position until the coupling is at least partly separated from the nipple.

A further object is to provide the butterfly valve with a tail portion so contoured that on retraction of the valve actuating sleeve, it will be subjected to the action of air flowing to discharge through the coupling in such fashion as to aero-dynamically actuate the valve to its closed position on full retraction of the sleeve, and whereby the valve may be moved from its open to its closed position irrespective of the position of the coupling.

With the foregoing objects in view together with such other objects and advantages as may subsequently appear, the invention resides in the parts and in the combination, construction and arrangement of parts hereinafter described and claimed, and as illustrated by way of example in the accompanying drawings in which:

Figure 1:
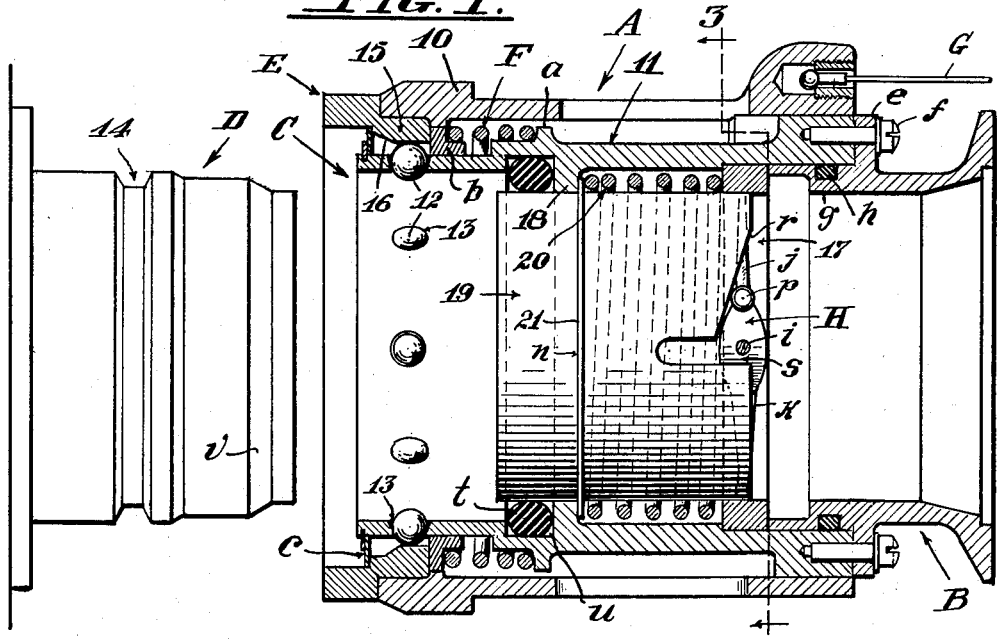
Fig. 1 is a view in longitudinal section partly in elevation of the coupling showing it in its detached position relative to a nipple and wherein the valve is closed.

Referring to the drawings more specifically A indicates generally the coupling housing which consists of an open ended cylindrical sleeve 10 mounted for longitudinal reciprocal movement on an open ended tubular cylinder 11 constituting a coupling member. One end of the cylinder 11 is fitted with an annular adaptor B for interconnection with a hose (not shown) in a conventional fashion, and the other end of which is fitted with a coupling assembly C for detachable interconnection with a nipple D. The coupling assembly C may be of any suitable construction, and constitutes no part of the present invention per se, but is preferably of an automatic locking type in which its engagement with the nipple D and its disengagement therefrom are controlled by manual actuation of the sleeve 10.

As here shown the coupling assembly C embodies a series of metallic balls 12 carried in circumferentially spaced circular apertures 13 formed in the outer end portion of the cylinder 11, which balls are adapted to be engaged in a circumferential channel 14 formed on the nipple D, and to be releasably held in such engagement by a crowding ring E fixedly mounted on the outer end of the sleeve 10. The ring E is formed with a circular inner end portion 15 the inner perimeter of which is dimensioned to seat on the balls 12 when positioned thereover, to hold the balls in the channel 14, and is formed with an enlarged intermediate portion 16 which when positioned over the balls 12 will permit the balls to move outwardly in the apertures 13 a distance sufficient to ride over the leading margin of the channel 14. A spring F bears between a flange $a$ on the cylinder 11 and a slide ring $b$ on the outer end portion of the cylinder 11 which slide ring bears against the crowding ring E and acts to normally hold the latter in its advanced ball engaging position. A stop $c$ on the outer end of the cylinder 11 limits outward movement of the ring E and sleeve 10, a lanyard G is connected to the sleeve 10 at the end thereof opposite the ring E whereby the sleeve 10 may be manually retracted in opposition to the spring F from a remote point to move the inner end portion 15 of the ring E clear of the balls 12.

The hose connecting adaptor B is formed with a circumferential flange $e$ which abuts the adjacent end of the cylinder 11 and is affixed thereto by bolts $f$, the adaptor B having a cylindrical end portion $g$ which extends telescopically into the cylinder 11 and carries a sealing ring $h$ which bears against the inner periphery of the cylinder 11 to seal the joint between the adaptor and the cylinder 11.

The cylinder 11 is formed with an internal flange 18 spaced outwardly from a valve supporting ring 17 the inner periphery of which is dimensioned to correspond to that of the ring 17, and slidably supported and guided on the inner peripheries of the ring 17 and flange 18 is a cylindrical sleeve 19 which is normally disposed in a retracted position by an expansion spring 20 coiled around the sleeve 19 and bearing between the ring 17 and a circumferential flange 21 on the outer periphery of the sleeve 19, the flange 21 comprising a split ring seated in a channel $n$ formed on the sleeve. The outer end of the sleeve 19 is arranged to be abutted by the outer end of the nipple D on advancing the coupling thereover, the sleeve 19 being designed to be advanced by the nipple D relative to the coupling in opposition to the spring 20 on moving the coupling to its interlocked connection with the nipple.

In carrying out the present invention, the cylinder 11 is equipped with a circular butterfly valve H which is pivoted axially thereof in a pair of trunnions $i$—$i$ carried on the valve supporting ring 17, the latter being fixedly mounted in the cylinder 11 at the inner end of the extension $g$ of the adaptor B. The valve H comprises opposed segmental tapered fins $j$ and $k$ extending on opposite sides of the axis thereof the perimeters of which are at least substantially semi-circular and approximately contact the inner periphery of the sleeve 19 when the valve is in its closed position in which the valve extends transversely of the sleeve, there being a slight clearance between the margin of the valve and the sleeve.

The trunnions $i$—$i$ pivotally engage diametrically opposed axially aligned bores $m$—$m$ formed in the margin of the valve between the segmental portions $j$ and $k$ thereof.

Figure 6:
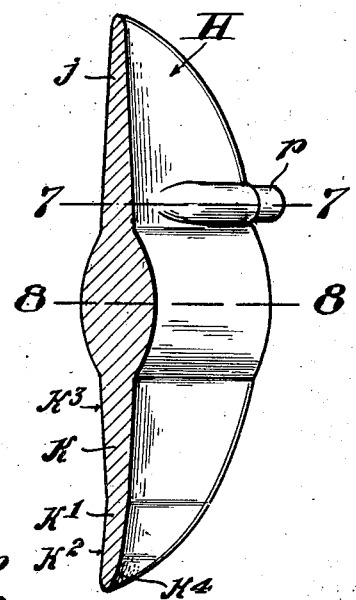
Fig. 6 is a combined section and perspective view of the butterfly valve.
Figure 7:
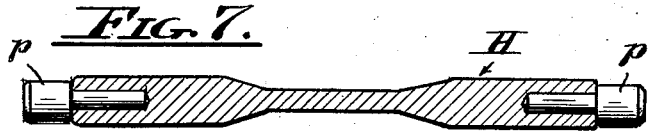
Fig. 7 is a detail in horizontal section as seen on the line 7—7 of Fig. 6.
Figure 8:
Fig. 8 is a detail in section taken on the line 8—8 of Fig. 6.

A feature of the invention resides in forming the segmental portion $k$ of the valve with an unbalanced tail portion $k^1$ as particularly shown in Fig. 6 which portion is characterized by having a plane rear surface $k^2$ projecting at a suitable obtuse angle relative to the mean plane of the rear face $k^3$ of the segmental fin portion $k$.

In practice this angle of the surface $k^1$ is not critical but is preferably four degrees or thereabouts, although it is shown in Fig. 6 somewhat exaggerated for the sake of clearness. The front face of the segmental fin portion $k$ merges into the semi-circular margin of the tail portion $k^1$ on an arc as indicated at $k^4$. By contouring the valve H as above set forth it is subject to being aerodynamically actuated from its open to its closed position as will be later described. To this end the tail portion $k^1$ is formed to extend rearwardly of the valve so that when the valve is disposed in its open position the tail portion will protrude into the portion of the air stream flowing above the valve (assuming the valve to then be extended horizontally) so that the pressure of flowing air will tend to force the fin portion $k$ downward and thereby effect closing of the valve.

Means are provided whereby advance of the sleeve 19 will effect swinging of the valve H to its horizontal open position, which means embodies a pair of opposed axially aligned pins $p$—$p$ projecting from the margin of the fin portion $j$ of the valve H in front of and in the path of travel of the inner end of the sleeve 19. The pins $p$—$p$ extend in parallel spaced relation to the axes of the trunnions $i$—$i$.

The aforesaid means also embodies parallel inclined faces or cams $r$—$r$ formed on the inner end of the sleeve 19 which cams are presented toward and normally abut the pins $p$—$p$ and act on advance of the sleeve 19 to move the pins $p$—$p$ downward together with the fin portion $j$ of the valve and thereby swing the valve to its open position. In order to permit passage and positioning of the inner end of the sleeve 19 past the trunnions $i$—$i$, the sleeve is formed with diametrically opposed longitudinally extending slots $s$—$s$ through which the trunnions extend, which slots lead from the lower inner ends of the cams $r$—$r$ and have open outer ends. The slots $s$—$s$ are adapted to receive and slidably conform to the pins $p$—$p$ when the valve is in its fully open position when the sleeve 19 is in its fully advanced position, thereby opposing the thrust of the air stream on the tail portion $k^1$ of the valve.

As a means for affording a seal between the coupling and the engaged nipple, the cylinder 11 is fitted with a resilient sealing ring $t$ mounted in a channel $u$ formed on the inner periphery of the cylinder 11 forward of the flange 18, which ring $t$ projects interiorly of the cylinder in the path of a beveled face $v$ formed on the outer end portion of the nipple D so that when the coupling and nipple are interconnected the ring $t$ will be engaged and compressed in the channel $u$ thereby producing the requisite seal.

As before stated the essence of the invention resides in the construction of the butterfly valve H, and its mounting and its mode of operation through the medium of the reciprocal sleeve 19 controlled by the nipple D and spring 20, irrespective of the particular type, construction, or mode of operation of the mechanism whereby the coupling is fastened to the nipple and whether it be of rotating, push-pull, or threaded type, to either of which the present invention is applicable if a nipple is provided for insertion within the outer end of the coupling.

In the operation of the invention, assuming the coupling to be attached to a hose or other conduit the sleeve 19 is normally retracted as shown in Fig. 1 under the urge of the spring 20, the flange 21 on the sleeve then abutting the flange 18 thereby limiting retractive movement of the sleeve. On air pressure being imposed on the valve H from the line to which the coupling is attached, the valve H will be moved to and maintained in its closed position transversely of the sleeve 19 under the urge of such pressure. The pins $p$—$p$ on the valve margin will then seat on the cams $r$—$r$ on the inner end of the sleeve 19.

On applying the coupling to the nipple D the outer end of the nipple is brought into abutting engagement with the outer end of the sleeve 19 so that on continued advance of the coupling over the nipple, the sleeve 19 will be caused to advance in opposition to the spring 20. This movement of the sleeve causes the cams $r$—$r$ thereon to bear on the pins $p$—$p$ and act to swing the valve H on the trunnions $i$—$i$ to an open position.

Figure 2:
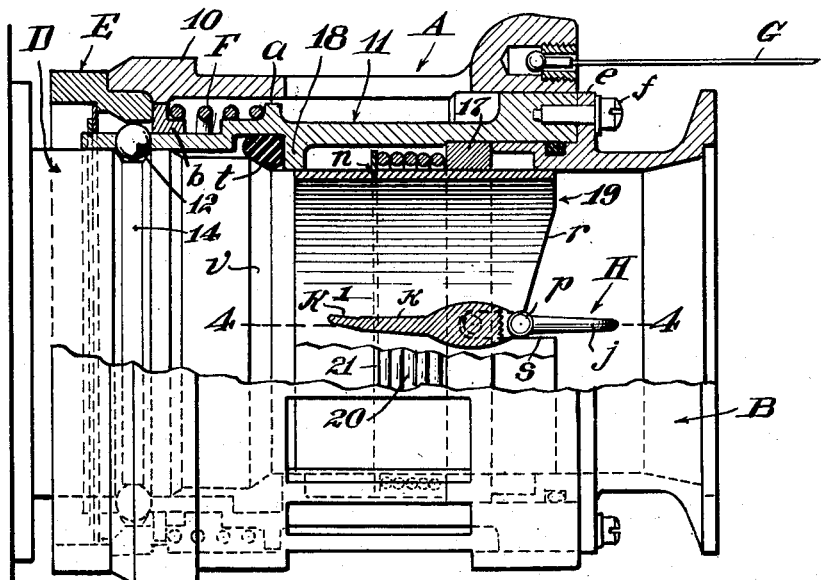
Fig. 2 is a view in section and elevation of the coupling showing it as applied to the nipple and with the valve open.
Figure 3:
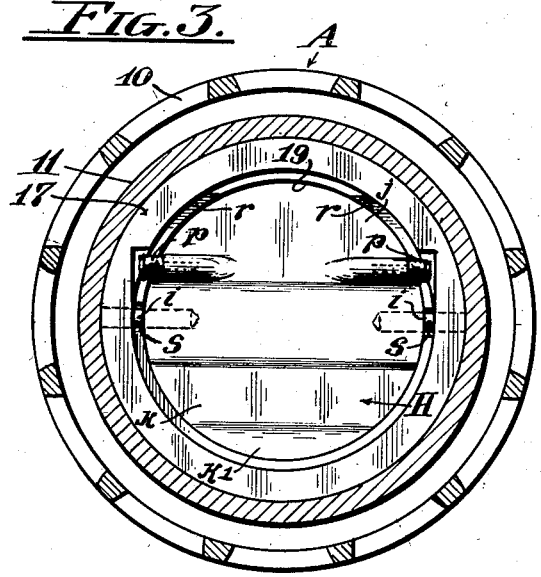
Fig. 3 is a view in cross section taken on the line 3—3 of Fig. 1.
Figure 4:
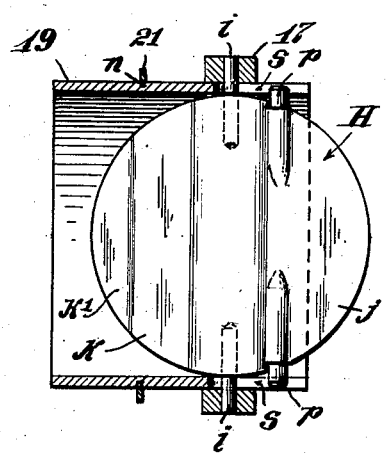
Fig. 4 is a detail in horizontal section and plan taken on the line 4—4 of Fig. 2.
Figure 5:
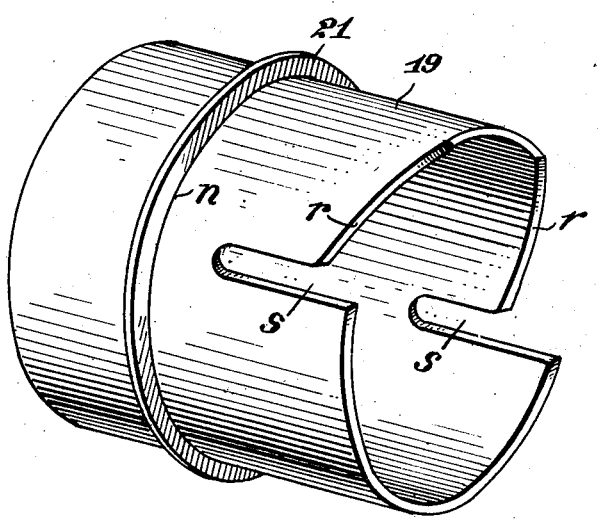
Fig. 5 is a perspective view of the valve operating sleeve as detached.

On the sleeve 19 being fully advanced as shown in Fig. 2, the cams $r$—$r$ will have swung the valve to its fully open position where it will extend longitudinally axially of the coupling. When thus positioned the pins $p$—$p$ will enter the outer ends of the slots $s$—$s$ in the sleeve thereby locking the valve against movement in its fully open position so that air may be directed through the coupling into the nipple. As before stated the air thus delivered may consist of highly heated air utilized in starting of a jet engine, during the delivery of which the coupling and nipple are interlocked as by means of the balls 12 and channel 14.

When it is desired to disengage the coupling from the nipple which in the construction shown is initially effected through the medium of the lanyard G in a usual fashion, the coupling on being withdrawn from the nipple the latter will be retracted relative to the sleeve 19 so that the latter will be retracted in the coupling under the urge of the spring 20 which movement initially releases the pins $p$—$p$ from engagement with the slots $s$—$s$, whereupon, in event a current of air is then passing through the sleeve 19 and flowing over the inclined surface $k^2$ of the tail $k^1$ of the valve, such air flow will act to swing the valve to its closed position, the sleeve 19 being then retracted and allowing the pins $p$—$p$ to traverse the cams $r$—$r$ to their normal position. In event of absence of air flow outwardly through the coupling the valve may remain open since closing of the valve is primarily dependent on aero-dynamic action thereon.

The valve structure herein set forth is primarily designed for use as an emergency cut-off in event the supply of air under pressure being delivered to and through the coupling is not shut off at its source before separation of the coupling from the nipple so as to prevent and insure against possible whipping of the hose as can occur where the coupling equipped end of a hose is free and air is being discharged therefrom under pressure. Such whipping of the hose is hazardous particularly where the air flowing therefrom is highly heated, since it is possible for persons near the whipping hose to be badly burned by the hot air flowing from the coupling. Manifestly automatic closing of the valve under the urge of the flowing air will terminate such flow except as to such as might pass around the closed valve, which is negligible.

I claim:

1. In a coupling for connecting a hose to a nipple including a tubular coupling member adapted to telescopically receive the nipple at one end thereof and having means for interlocking the telescoped coupling member and nipple; a normally retracted longitudinally slidable sleeve in said member one end of which is positioned in the path of travel of the outer end of the nipple advancing into said member, a butterfly valve pivotally mounted in said coupling member and normally disposed in a closed position under the urge of air pressure imposed thereon, said valve having its periphery normally conforming to the inner periphery of said sleeve, a pin projecting from the margin of said valve from a region to one side of the pivotal axis of the valve and into the path of travel of said sleeve, and a cam on said sleeve engageable with said pin operable on advance of said sleeve to swing said valve to its open postion.

2. In a coupling member embodying an open ended cylinder adapted to receive a nipple in one end thereof, a sleeve mounted for longitudinal movement in said cylinder having one end thereof positioned in the path of travel of the outer end of said nipple, a coil spring encompassing said sleeve acting to normally maintain said sleeve in its retracted position, a butterfly valve having a main valve portion received in said sleeve, means pivotally supporting said valve to swing to and from a closed position in said sleeve, and cooperating means on said sleeve and said valve for swinging said valve to an open position on advance of said sleeve and for locking said valve in its open position when said sleeve is in its fully advanced position.

3. The structure called for in claim 2 together with aero-dynamically actuated means on said valve for urging it to a closed position on its release upon retraction of said sleeve.

4. The structure called for in claim 2 together with aero-dynamically actuated means on said valve for urging it to a closed position on its release upon retraction of said sleeve comprising a tail portion formed on said valve having an inclined face arranged to extend into the path of flow of an air stream passing through said sleeve in a direction and in such manner as to swing said valve to its closed position.

5. In a coupling member, embodying an open ended cylinder adapted to receive a nipple in one end thereof, a butterfly valve in said cylinder, means carried by said cylinder pivotally supporting said valve, said valve being adapted to be disposed in a closed position by air pressure imposed on one side thereof, a sleeve mounted for longitudinal movement in said cylinder one end portion of which substantially encompasses the periphery of said valve when in its closed position, spring means operably interposed between said cylinder and said sleeve normally retracting said sleeve, means limiting retractive movement of said sleeve normally positioning the outer end of said sleeve in the path of travel of a nipple inserted in said cylinder, and interengaging means on said valve and sleeve for swinging said valve to an open position on advancing said sleeve in said cylinder.

6. The structure called for in claim 5 together with co-operating means on said valve and sleeve including part of said interengaging means for releasably locking said valve in its open position when said sleeve is in its fully advanced position.

7. The structure called for in claim 5 in which said interengaging means on said valve and sleeve comprises a pin projecting from said valve parallel to and to one side of the pivotal axis of the valve and a cam on said sleeve engageable with said pin upon axial advance movement of said sleeve.

8. In a coupling for connecting a hose to a nipple including a tubular coupling member adapted to telescopically receive the nipple at one end thereof and having means for interlocking the telescoped coupling member and nipple; a normally retracted longitudinally slidable sleeve in said member one end of which is positioned in the path of travel of the outer end of the nipple advancing into said member, a butterfly valve pivotally mounted in said coupling member and normally disposed in a closed position under the urge of air pressure imposed thereon, said valve having its periphery normally conforming to the inner periphery of said sleeve, a pin projecting from the margin of said valve from a region to one side of the pivotal axis of the valve and into the path of travel of said sleeve, and a cam on said sleeve engageable with said pin operable on advance of said sleeve to swing said valve to its open position, said cam comprising an inclined face on the other end of said sleeve, said sleeve having an axially extending open-ended slot positioned at the inner end of said inclined face and receiving said pin after the same has traversed said inclined face whereby to releasably lock said valve in open position.

9. In a coupling for connecting a hose to a nipple including a tubular coupling member adapted to telescopically reecive the nipple at one end thereof and having means for interlocking the telescoped coupling member and nipple; a normally retracted longitudinally slidable sleeve in said member one end of which is positioned in the path of travel of the outer end of the nipple advancing into said member, a butterfly valve pivotally mounted in said coupling member and normally disposed in a closed position under the urge of air pressure imposed thereon, said valve having its periphery normally conforming to the inner periphery of said sleeve, a pin projecting from the margin of said valve from a region to one side of the pivotal axis of the valve and into the path of travel of said sleeve, a cam on said sleeve engageable with said pin operable on advance of said sleeve to swing said valve to its open position, said cam comprising an inclined face on the other end of said sleeve, said sleeve having an axially extending open-ended slot positioned at the inner end of said inclined face and receiving said pin after the same has traversed said inclined face whereby to releasably lock said valve in open position, and aero-dynamically actuated means on said valve for urging it to a closed position when said pin is released from said slot.

References Cited in the file of this patent

UNITED STATES PATENTS

| 2,228,733 | Reichhelm | Jan. 14, 1941 |
| 2,302,151 | Sloan | Nov. 17, 1942 |

FOREIGN PATENTS

| 2,870 | Great Britain | 1867 |

UNITED STATES PATENT OFFICE

CERTIFICATE OF CORRECTION

Patent No. 2,824,755

February 25, 1958

Walter Earl Lamphear

It is hereby certified that error appears in the above numbered patent requiring correction and that the said Letters Patent should read as corrected below.

In the grant, line 2, for "assignor to Roylin Incorporated, a corporation of California," read -- assignor to Roylyn Incorporated, a corporation of California, --; line 11, for "Roylin Incorporated, its successors" read -- Roylyn Incorporated, its successors --; in the heading to the printed specification, lines 3 and 4, for "assignor to Roylin Incorporated, a corporation of California" read -- assignor to Roylyn Incorporated, a corporation of California.

Signed and sealed this 29th day of April 1958.

(SEAL)

Attest:
KARL H. AXLINE
Attesting Officer

ROBERT C. WATSON
Commissioner of Patents